United States Patent
Faure et al.

(10) Patent No.: US 6,376,129 B2
(45) Date of Patent: Apr. 23, 2002

(54) SULPHONATED POLYIMIDES, MEMBRANES PREPARED WITH THEM, AND A FUEL CELL DEVICE THAT INCLUDES THESE MEMBRANES

(75) Inventors: Sylvain Faure, Air-en-Provence; Michel Pineri, Montbonnot; Pierre Aldebert, La Buisse; Régis Mercier, Juigny; Bernard Sillion, Lyons, all of (FR)

(73) Assignee: Commissariat a L'Energie Atomique, Paris (FR)

( * ) Notice: Subject to any disclaimer, the term of this patent is extended or adjusted under 35 U.S.C. 154(b) by 0 days.

(21) Appl. No.: 09/838,306

(22) Filed: Apr. 20, 2001

Related U.S. Application Data

(62) Division of application No. 09/171,203, filed as application No. PCT/FR97/00804 on May 6, 1997, now Pat. No. 6,245,881.

(30) Foreign Application Priority Data

May 7, 1996 (FR) ............................................. 96 05707

(51) Int. Cl.$^7$ ................................................. H01M 4/86
(52) U.S. Cl. .......................... 429/306; 429/30; 429/41; 429/46; 429/310; 429/311
(58) Field of Search .............................. 429/30, 41, 46, 429/306, 310, 311

(56) References Cited

U.S. PATENT DOCUMENTS

| | | | |
|---|---|---|---|
| 5,618,334 A | * 4/1997 | Ozcayir et al. | ................. 96/14 |
| 5,725,633 A | * 3/1998 | Ozcayir et al. | ................. 95/45 |
| 5,964,925 A | * 10/1999 | Ozcayir et al. | ................. 96/14 |
| 6,248,469 B1 | * 6/2001 | Formato et al. | .............. 429/41 |

* cited by examiner

*Primary Examiner*—Ana Woodward
(74) *Attorney, Agent, or Firm*—Burns Doane Swecker & Mathis LLP

(57) ABSTRACT

The invention relates to sulphonated polyimides, notably of formula (I)

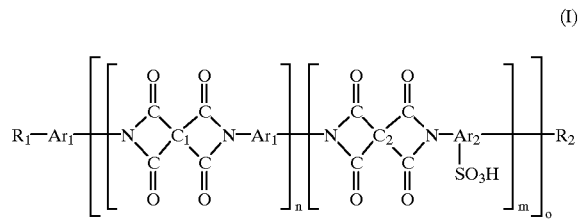

The invention also relates to an ion exchange membrane that includes such a polyimide and a fuel cell that includes such a membrane.

The membranes of the invention have excellent durability and low cost and the fuel cells can be used, in particular, in electric vehicles.

3 Claims, 2 Drawing Sheets

SULPHONATED POLYIMIDES, MEMBRANES PREPARED WITH THEM, AND A FUEL CELL DEVICE THAT INCLUDES THESE MEMBRANES

This application is a divisional of U.S. Patent Ser. No. 09/171,203 filed on May 25, 1999 now U.S. Pat. No. 6,245,881, national phase of PCT/FR97/00804 filed on May 6, 1997, and International Application Ser. No. 96/05707, which was filed on May 7, 1996, and was not published in English.

This invention relates to sulphonated polyimides, which find application particularly in the preparation of ion exchange membranes notably for the manufacture of fuel cells.

The use of solid polymer electrolytes was proposed in the 1950s and applied notably in the construction of fuel cells which were intended particularly to supply space craft with energy.

The interest in fuel cells is now progressing beyond the generation of power for space craft and the automobile industry has interest in them for at least two reasons.

the first rests on the concern to avoid pollution caused by internal combustion engines. In effect it is clear that it will be difficult to prevent all discharges of nitrogen oxides, unburnt hydrocarbons and oxygenated compounds by means of all the improvements that one can expect through better control of combustion.

the second reason, for the longer term, is to research motors that use a fuel other than the fossil fuels that it is known will not last for ever.

Any system based on hydrogen can respond to the concerns mentioned above. The source of supply is potentially inexhaustible and electrochemical combustion only produces water.

Figure 1:
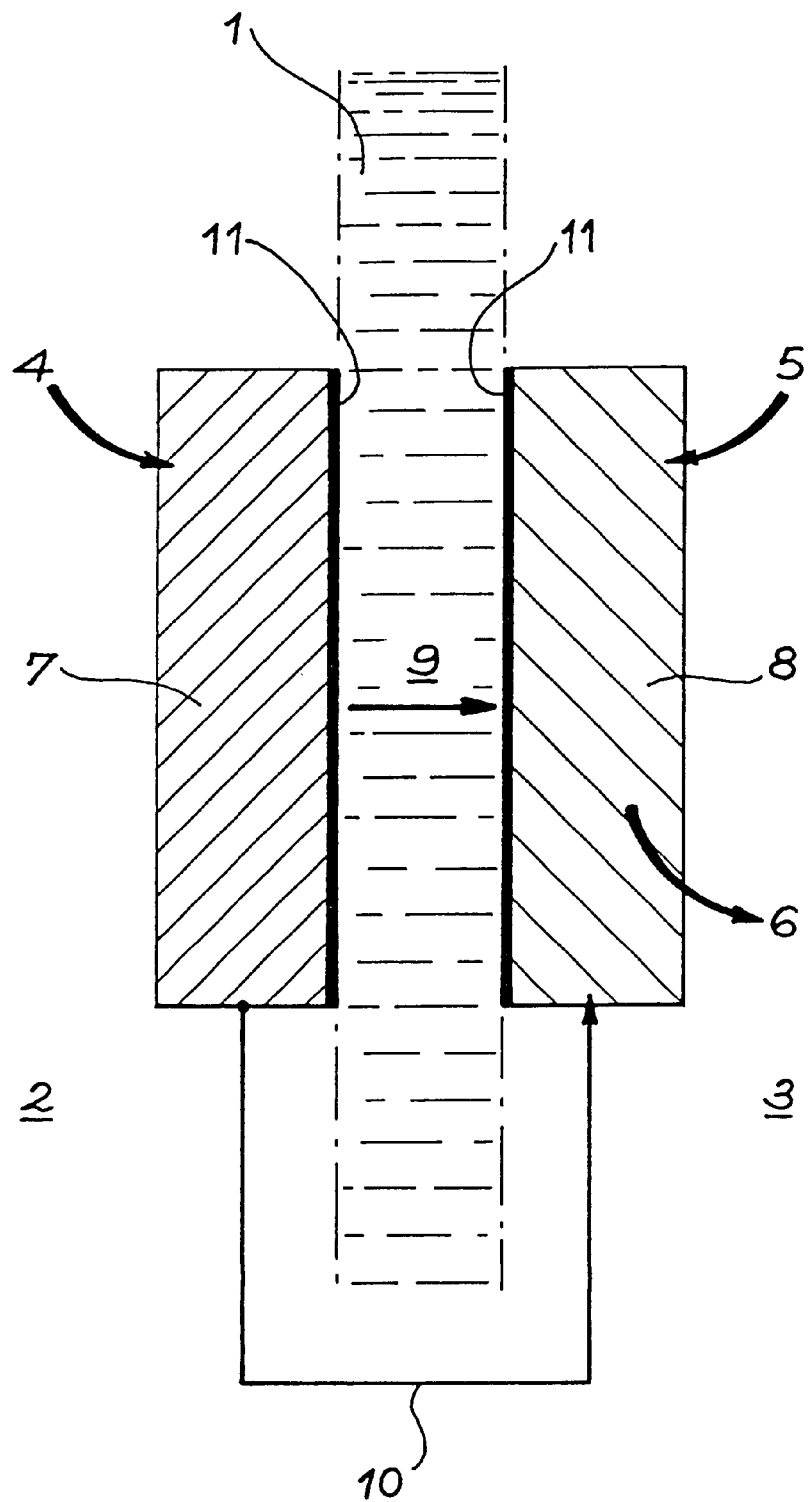

The schematic assembly of a fuel cell that permits at the same time the production of electrical energy and incidentally the synthesis of water for the needs of the crew of a space vehicle, is represented in part in FIG. 1 appended.

The ion exchange type of membrane formed from a solid polymer electrolyte (1), is used to separate the anode compartment (2) where oxidation occurs of the fuel, such as hydrogen $H_2$ (4) according to the equation:

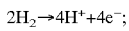

from the cathode compartment (3) where the oxidant such as oxygen $O_2$ is reduced according to the equation:

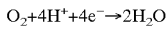

with production of water (6) while the anode and the cathode are connected through an external circuit (10).

The anode (7) and the cathode (8) are essentially constituted by a porous support, for example made of carbon, on which particles of a noble metal such as platinum are deposited.

The membrane and electrode assembly is a very thin assembly with a thickness of the order of a millimetre and each electrode is supplied from the rear with the gases using a fluted plate.

One very important point is to properly maintain the membrane in an optimum moisturised state so as to ensure maximum conductivity.

The membrane has a double role. On the one hand it acts as an ionic polymer permitting the transfer (9) of hydrated protons $H_3O^+$ from the anode to the cathode, and on the other hand it keeps each of the gases oxygen and hydrogen in their compartments.

The polymer constituting the membrane must therefore fulfil a certain number of conditions relating to its mechanical, physico-chemical and electrical properties.

First of all, the polymer must be able to give thin films, between 50 and 100 micrometers thick, which are dense and without defects. The mechanical properties, rupture stress modulus, ductility, must make it compatible with the assembly operations which include, for example, being clamped between metal frames.

The properties must be conserved when it passes from a dry to a moist state.

The polymer must have good thermal stability to hydrolysis and exhibit good resistance to reduction and oxidation up to 100° C. This stability shows itself in terms of variation in ionic resistance and in terms of variation in mechanical properties.

Finally, the polymer must have high ionic conductivity, this conductivity is provided by strongly acidic groups such as phosphoric acid groups, but above all by sulphonic groups linked to the polymer chain. Because of this these polymers will generally be specified by their equivalent mass, that is to say, the weight of polymer in grams per acid equivalent.

By way of example, the best systems developed at present are capable of supplying a specific power of 1 W.cm$^{-2}$, or a current density of 4 A.cm$^{-2}$ for 0.5 Volts.

Since 1950, numerous families of polymers or sulphonated polycondensates have been tested as membranes without it being at present possible to establish with certainty the relationships between chemical structure, film morphology and performance.

At first, sulphonated phenolic type resins prepared by sulphonation of polycondensed products such as phenolformaldehyde resins were used.

The membranes prepared with these products are low cost, but they do not have sufficient stability to hydrogen at 50–60° C. for applications of long duration.

Next one turned towards sulphonated polystyrene derivatives which have greater stability compared with that of the sulphonated phenolic resins but cannot be used at more than 50–60° C.

At the present time, the best results are obtained with copolymers, the linear main chain of which is perfluorinated and the side chain of which carries a sulphonic acid group.

These copolymers are commercially available under the trademark NAFION® from the Du Pont Company or ACIPLEX-S® from the Asahi Chemical Company. Others are experimental, products by the DOW Company for the manufacture of the membrane named "XUS".

These products have been the subject of numerous developments and conserve their properties for several thousands of hours between 80 and 100° C. with current densities that depend on the partial pressures of the gases and the temperature. The current density is typically 1 A.cm$^{-2}$ at 0.7 Volts for Nafion® 112 with a thickness of 50 μm.

The polymers of the Nafion® type are obtained by co-polymerisation of two fluorinated monomers, one of which carries the SO$_3$H group. A second route for obtaining perfluorinated membranes has been explored in documents by G.G. Scherer: Chimia, 48 (1994), p. 127–137; and by T. Monose et al., patent U.S. Pat. No. 4,605,685. It involves the grafting of styrene or fluorinated styrene monomers onto fluorinated polymers which are subsequently sulphonated. These membranes however have properties close to those of fluorinated co-polymers.

If one tries to draw lessons from the teachings of the prior art, it is apparent that the best chemical structure for a polymer that can be used in the form of a membrane for the exchange of protons corresponds to the following criteria:
a main chain totally perfluorinated
branches bearing a sulphonic acid group
equivalent weight between 800 and 1200.

In the documents by W. Grot ; Chem. Ing. Tech., 50, 299 (1978) and by G.G. Scherer : Phys. Chem., 94, 1008–1024 (1990) they claim for these structures "very good thermal stabilities"; however, it should be taken into consideration that the notion of thermal stability has to be taken here as the ability to resist acid hydrolysis at a temperature between 60 and 100° C. over a period of several thousands of hours and that therefore the information from these documents must be considered prudently.

To that, it would be proper to add resistance to oxidation in contact with oxygen in the cathode compartment and resistance to reduction in the presence of $H_2$.

On the other hand, from the viewpoint of the development of fuel cells that can be used for automobile traction, another important problem that will henceforth be clearly identified by the experts is the cost of the membrane.

In 1995, the cost of membranes produced or under development was of the order of 3000 to 3500 French francs per square meter and one might estimate that it would be necessary to divide this cost by 10 or indeed 20 in order for it to play a part in the industrial development of fuel cells for the automobile industry.

With a view to lowering the costs, poly 1,4-(diphenyl-2, 6)-phenyl ethers, sulphonated on the main chain, the polyether-sulphones and polyether-ketones have been synthesised and tested without really holding their own against the fluorinated membranes with regard to their immediate performance and their durability.

In effect, the rigidity of the chains makes these products insoluble and it becomes difficult to obtain the thin films necessary for the creation of the membranes.

There therefore exists an unsatisfied need for polymers which can be easily made into the form of membranes, namely of thin films which meet the conditions already mentioned above relating notably to their mechanical, physico-chemical and electrical properties, in particular those relating to their thermal stability and their resistance to acid hydrolysis, at elevated temperature for a long period of time, their resistance to oxidation in contact with oxygen as well as their resistance to reduction in the presence of hydrogen.

Furthermore, there exists a need for membranes which, at the same time as satisfying the properties above, can be manufactured at low cost, by a simple method with raw materials that are readily available.

The aim of this invention is to provide a polymer which satisfies the group of needs previously mentioned.

A further aim of the invention is to provide membranes that include or are prepared with this polymer and a fuel cell that includes these membranes.

These aims and others are met conforming to the invention by a polyimide that comprises repeating structures of formula $(I_n)$.

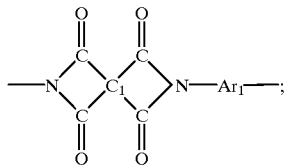

and repeating structures of formula $(I_m)$

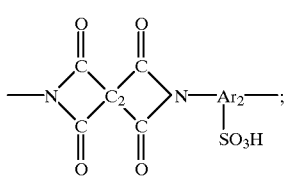

in which
the groups $C_1$ and $C_2$ can be identical or different and each represent a tetravalent group that includes at least one aromatic carbon ring possibly substituted and having from 6 to 10 atoms of carbon and/or a heterocyclic ring with aromatic character, possibly substituted and having from 5 to 10 atoms and including one or more heteroatoms chosen from among S, N, and O; $C_1$ and $C_2$ each forming with the neighbouring imide groups rings with 5 or 6 atoms.

The $Ar_1$ and $Ar_2$ groups can be identical or different and each represent a divalent group that includes at least one aromatic carbon ring possibly substituted and having from 6 to 10 atoms of carbon and/or a heterocyclic ring with aromatic character, possibly substituted and having from 5 to 10 atoms and including one or more heteroatoms chosen from among S, N and O; at least one of said aromatic carbon rings and/or heterocyclic rings of $Ar_2$ being, in addition substituted by at least one sulphonic acid group.

The repeating structure (In) is repeated k times and the repeating structure (Im) is repeated k times, j and k being two whole numbers.

Preferably, j represents a whole number from 1 to 200, more preferably from 4 to 60 and k represents a whole number from 1 to 300, preferably from 4 to 120.

The co-polymer according to the invention, depending on the positioning of the two structures which make it up, can be defined as being a sequential, alternating or a statistical co-polymer.

However the polyimide according to the invention which can be defined as a sulphonated polyimide corresponds preferably to the following general formula (I):

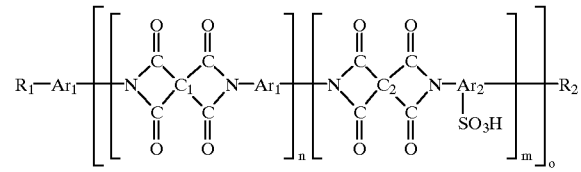

in which $C_1$, $C_2$, $Ar_1$ and $Ar_2$ have the meanings already given to them above and where each of the groups $R_1$ and $R_2$ represent $NH_2$ or a group of formula

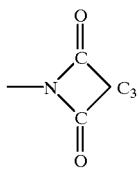

where $C_3$ is a divalent group that includes at least one aromatic carbon ring possibly substituted and having from 6 to 10 carbon atoms and/or a heterocyclic ring with aromatic character, possibly substituted and having from 5 to 10 atoms and including one or more heteroatoms chosen from among S, N and O.

$C_3$ forming with the neighbouring imide group a ring with 5 or 6 atoms.

In the formula (I) above:
m represents a whole number preferably from 1 to 20, more preferably from 2 to 10;
n represents a whole number preferably from 1 to 30, more preferably from 2 to 20;
o represents a whole number preferably from 1 to 10, more preferably from 2 to 6;

The molecular weight of the polyimide according to the invention is generally from 10,000 to 100,000, preferably from 20,000 to 80,000.

The equivalent molecular weight of the polyimide according to the invention is preferably from 400 to 2500, more preferably from 500 to 1200.

Because of this, the numbers m and n (j and k) will be chosen in such a way that the equivalent molecular weight shall be from 400 to 2500, preferably from 500 to 1200, the equivalent molecular weight having been defined above.

In a general way, it is known that the heterocyclic polymers and in particular the polyimides can allow one to obtain films thanks to their synthesis in two steps.

These "heterocyclic" polymers are used, for example in aeronautical and space applications which require excellent mechanical properties and good resistance to oxidation. These applications are very much removed from the field of this patent application.

The specific sulphonic co-polyimides of this invention offer, in a surprising manner, all the properties already mentioned above as being required for the production of membranes, in particular cation exchange membranes, notably for fuel cells, the performances of which are compatible with the envisaged applications.

In particular, The specific co-polymers according to the invention can be easily formed into films or membranes of a suitable thickness.

The polymers according to the invention have a very high ion exchange capacity greater than 0.4 meq/g, for example from 0.8 to 2.5 meq/g, which is greater than the ion exchange capacity of the polymers of the prior art which generally achieve only a maximum of 0.9 to 1.2 meq/g.

The membranes comprising the polymers according to the invention also have high thermal stability, for example to acid hydrolysis at high temperature, that is to say for the most stable membranes up to temperatures that can reach, for example 100° C., and this for a long duration that can extend, for example, to 5000 hours.

These conditions are the conditions of use that can prevail in the cells where the membranes are put to use.

Similarly, the membranes according to the invention have excellent resistance to reduction and to oxidation.

The invention is therefore totally dissociated from the prior art mentioned above in which the polymers recommended for the manufacture of membranes for the exchange of cations and in particular protons, notably for fuel cells have a structure fundamentally different from that of the polymers of the polyimide type of the present application for a patent.

This patent application departs radically and in a surprising way from the processes of the prior art by preparing specific polyimides with a view to their use in cation exchange membranes.

In effect, in a general way, the polyimides have been neither mentioned not proposed for use in this field, on the other hand, the specific polyimides according to the invention have mechanical, physico-chemical and electrical properties superior to those of the polymers of the prior art as is demonstrated below.

Nothing allowed one to suppose that the polyimides according to the invention were going to totally satisfy the requirements expressed and until now not satisfied for the preparation of cation exchange membranes.

Finally, as described below, the polyimides according to the invention are prepared in a simple manner, by methods proven on the industrial scale and from raw materials that are available and which are low cost. Because of this, the membranes obtained and the fuel cells that include these membranes will also see their costs much reduced.

The invention will now be described in more detail, making reference to the attached drawings in which:

FIG. 1 diagrammatically represents a fuel cell and its electrode-membrane-electrode assembly.

The membrane can notably be a membrane that comprises a polymer according to this invention.

Figure 2:
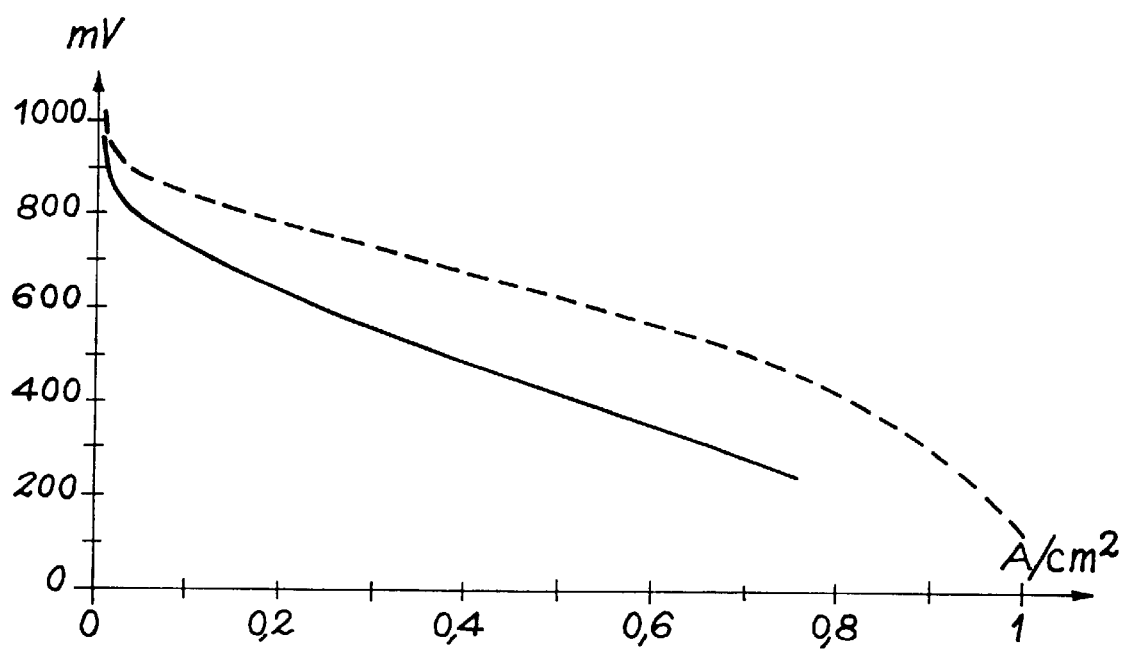

FIG. 2 shows a graph with on the y-axis, the voltage expressed in mV and on the x-axis the current density expressed in A/cm$^2$ on which are plotted the polarisation curves obtained with non-bonded "E-TEK" electrodes (0.35 mg of Pt/cm$^2$ and 0.8 mg of Nafion®/cm$^2$) and respectively a Nafion®117 membrane (curve drawn with the broken line) and a phthalic polyimide membrane of this invention (curve drawn with the full line). The operating temperature of the cell was 50° C. and the pressures of $H_2$ and $O_2$ were 4 bars.

Figure 3:
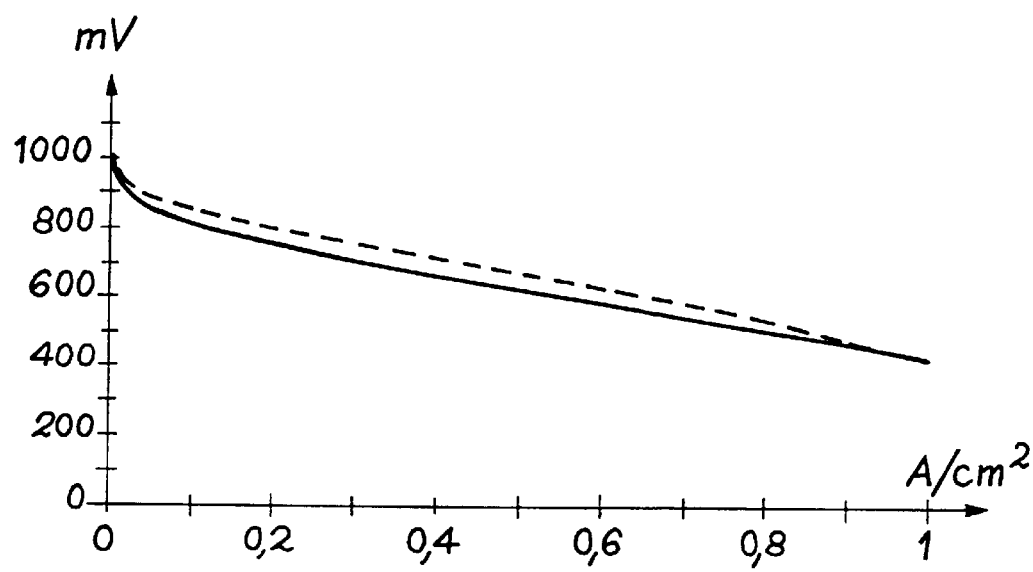

FIG. 3 is a graph analogous to that of FIG. 2 but the polarisation curves are those obtained on the one hand with a Nafion®117 membrane (curve drawn a with broken line) and on the other hand with a naphthalenic polyimide of this invention (curve drawn with a full line) and the operating temperature of the cell was 70° C.

In the formulae (In), (Im) and (I) cited above, $C_1$ and $C_2$ can be identical or different and each represents, for example, a benzene ring, possibly substituted by one or two substituents chosen from among the alkyl and alkoxy groups having 1 to 10 C atoms and the halogen atoms; or several benzene rings, possibly substituted by one or more substituents chosen from among the alkyl and alkoxy groups having 1 to 10 C atoms and the halogen atoms, for example from 2 to 4 rings, bonded to one another by a single bond or by a divalent group.

Said divalent group is chosen for example, from among
a divalent group derived from a straight chain or branched alkyl group (for example an alkylidene or alkylene group) with 1 to 10 C atoms, possibly substituted, preferably on the same carbon, by one or more halogens chosen from among F, Cl, Br and I and/or by one or more hydroxyl groups and more preferably said divalent group is a divalent group derived from a perfluorinated alkyl group, for example a perfluorinated alkylene group.

a heteroatom chosen from among O, S,

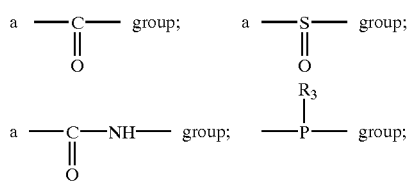

-continued

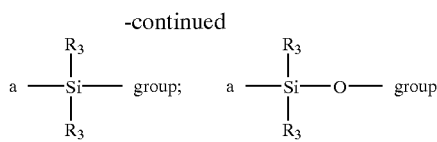

where $R_3$ is chosen from among alkyl groups with from 1 to 10 carbon atoms such as methyl, ethyl, isopropyl etc.

$C_1$ and $C_2$ can also each represent a condensed carbon polycyclic group, possibly substituted by one or more substituents chosen from among alkyl and alkoxy groups with 1 to 10 C atoms, and halogen atoms, comprising for example 2 to 5 benzene rings chosen for example from among naphthalene, phenanthrene, coronene, perylene etc.

$C_1$ and $C_2$ can also represent a heterocyclic group or a condensed heterocyclic group, with aromatic character such as thiophene, pyrazine, pyridine, furane, quinoline, quinoxaline, isobenzofurane, this heterocyclic group possibly being substituted by one or more substituents chosen from among the alkyl groups (for example, methyl, ethyl, isopropyl, etc.) and alkoxy groups with from 1 to 10 C atoms and halogen atoms (F, Cl, Br, I).

Among the polyimides that can be used in the context of the invention, one may mention those in which $C_1$ is a benzene ring and $C_2$ an assembly of two benzene rings linked to one another by an oxygen bridge; or $C_1$ is made up of benzene rings, preferably two benzene rings linked to one another by one or more perfluoroalkylene groups and $C_2$ is made up of benzene rings, preferably two benzene rings linked to one another by one or more divalent perfluoroalkyl or perfluoroalkylene groups; or $C_1$ is a benzene ring and $C_2$ is a naphthalene ring; or $C_1$ and $C_2$ are both naphthalene rings.

$Ar_1$ and $Ar_2$ can be identical or different and each represent, for example, a divalent benzene ring with meta or para links; possibly substituted by one or more substituents chosen from among the alkyl and alkoxy groups with from 1 to 10 C atoms, such as methyl, ethyl, isopropyl, butyl, methoxy etc. and halogen atoms; or several benzene rings, possibly substituted by one or more substituents chosen from among the alkyl and alkoxy groups with from 1 to 10 C atoms and the halogen atoms, for example with 2 to 5 rings, linked to one another by a single bond or by a divalent group.

Said divalent group is chosen for example from among a divalent group derived from a linear or branched alkyl group (for example an alkylidene or alkylene group) with 1 to 10 C atoms, possibly substituted, preferably on the same carbon atom by one or more halogens, chosen from among F, Cl, Br and I and/or by one or more hydroxy groups. Preferably said divalent group is a divalent group derived from a perfluorinated alkyl group, for example a perfluorinated alkylene group.

a heteroatom chosen from among O, S,

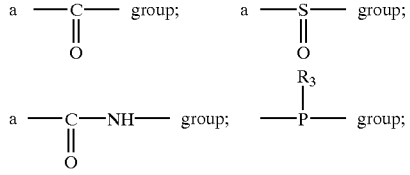

where $R_3$ is chosen from among alkyl groups with from 1 to 10 carbon atoms such as methyl, ethyl, isopropyl etc.

$Ar_1$ and $Ar_2$ can also each represent a condensed carbon polycyclic group possibly substituted by one or more substituents chosen from among alkyl and alkoxy groups with 1 to 10 C atoms, and halogen atoms, comprising for example 2 to 5 benzene rings chosen for example from among naphthalene, phenanthrene, coronene, perylene etc.

$Ar_1$ and $Ar_2$ can also each represent a heterocyclic group or a condensed heterocyclic group, with aromatic character such as thiophene, pyrazine, pyridine, furane, quinoline, quinoxaline, isobenzofurane, this heterocyclic group possibly being substituted by one or more substituents chosen from among the alkyl groups (for example, methyl, ethyl, isopropyl, etc.) and alkoxy groups with from 1 to 10 C atoms and halogen atoms (F, Cl, Br, I).

According to the invention, at least one of the rings of $Ar_2$ for example benzene rings or polyphenyl rings or others, is substituted additionally by one or more sulphonic acid groups.

The preferred polyimides are those in which $Ar_1$ is a diphenylmethane group and $Ar_2$ is a biphenyl-disulphonic group; where $Ar_1$ is a benzene group, and $Ar_2$ is a biphenyl-disulphonic group; or $Ar_1$ is a diphenyl ether group and $Ar_2$ is a biphenyl-disulphonic group.

$C_3$ is, for example, a benzene ring or a naphthalene ring possibly substituted by one or more substituents chosen from among the alkyl and alkoxy groups with 1 to 10 C atoms and the halogen atoms.

Examples of groups $C_1$ and $C_2$ are as follows:

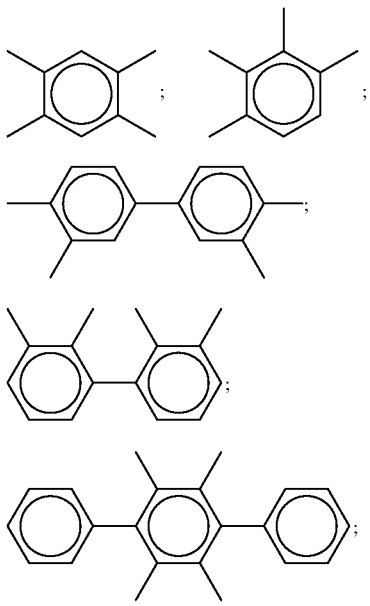

-continued
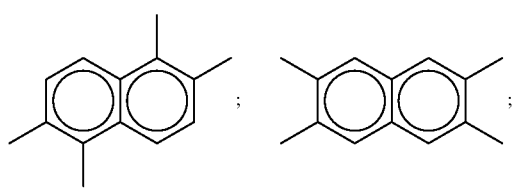
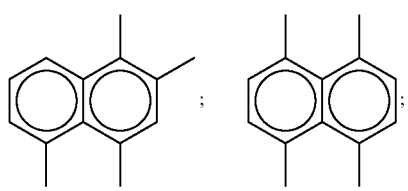
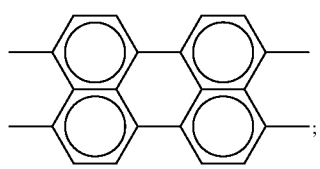
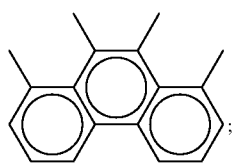
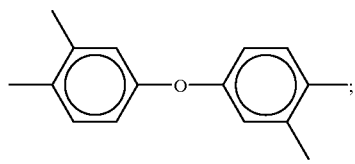
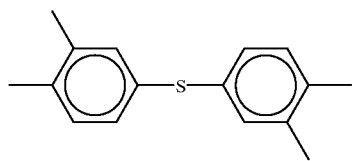
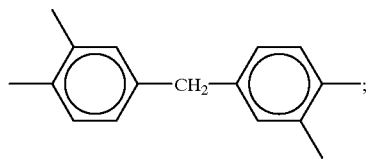
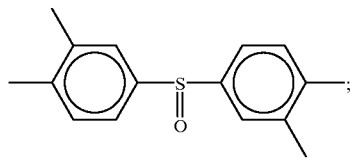
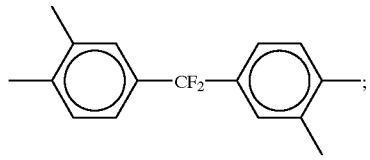
-continued
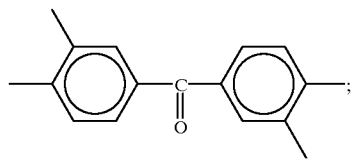
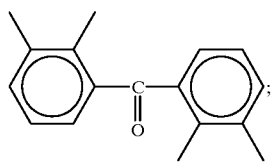
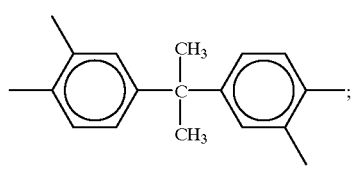
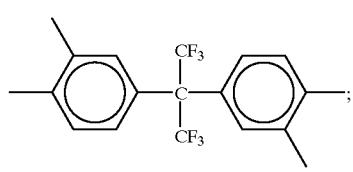
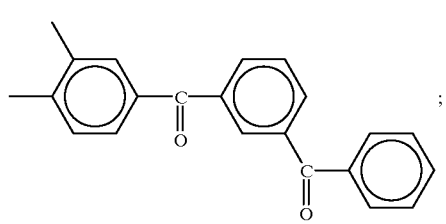
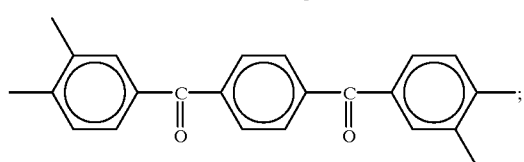
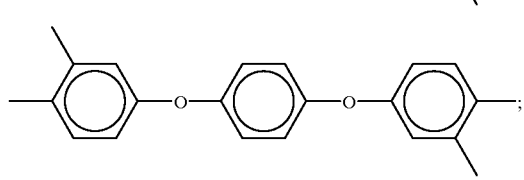
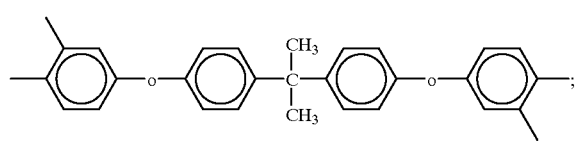
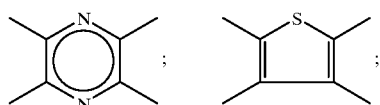
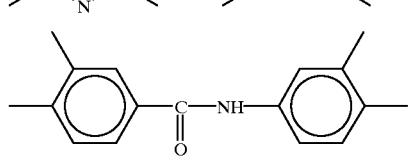

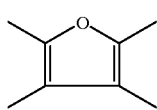
Examples of Ar₁ groups are as follows
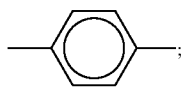 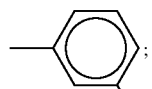
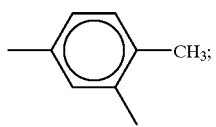 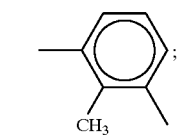
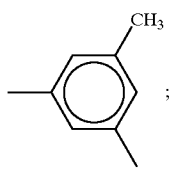 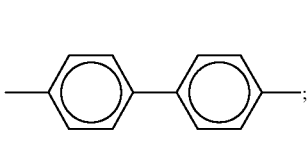
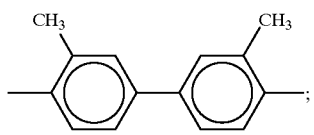
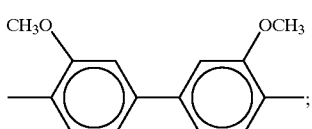
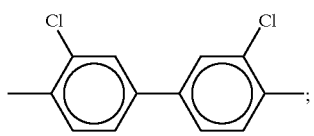
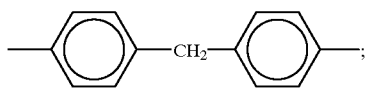
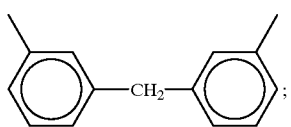
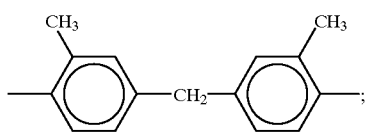
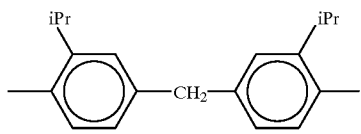
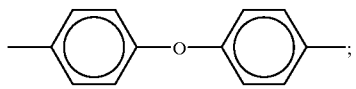
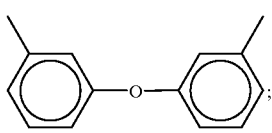
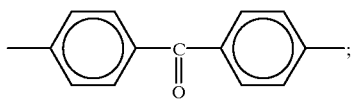
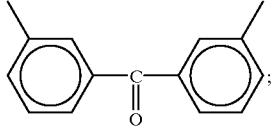
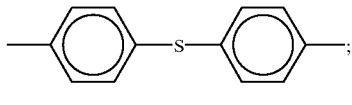
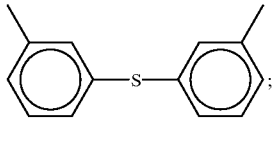
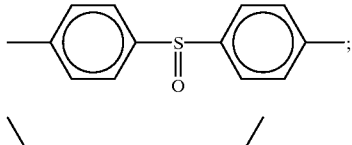
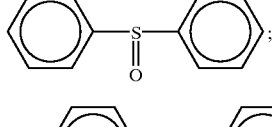
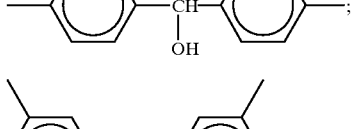
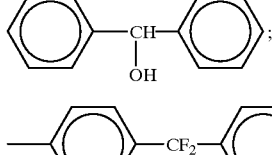
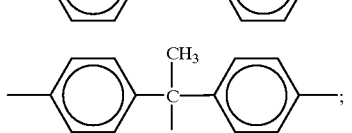
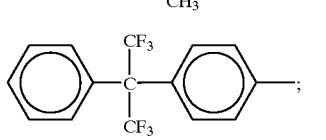
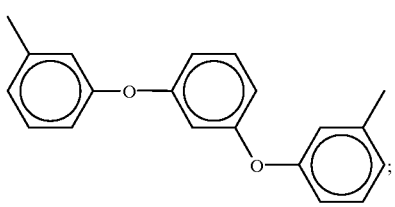

Examples of C₃ groups are as follows:

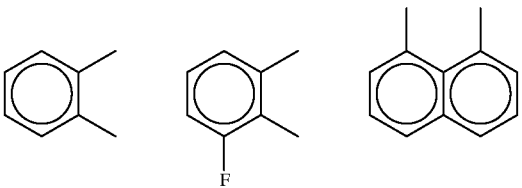

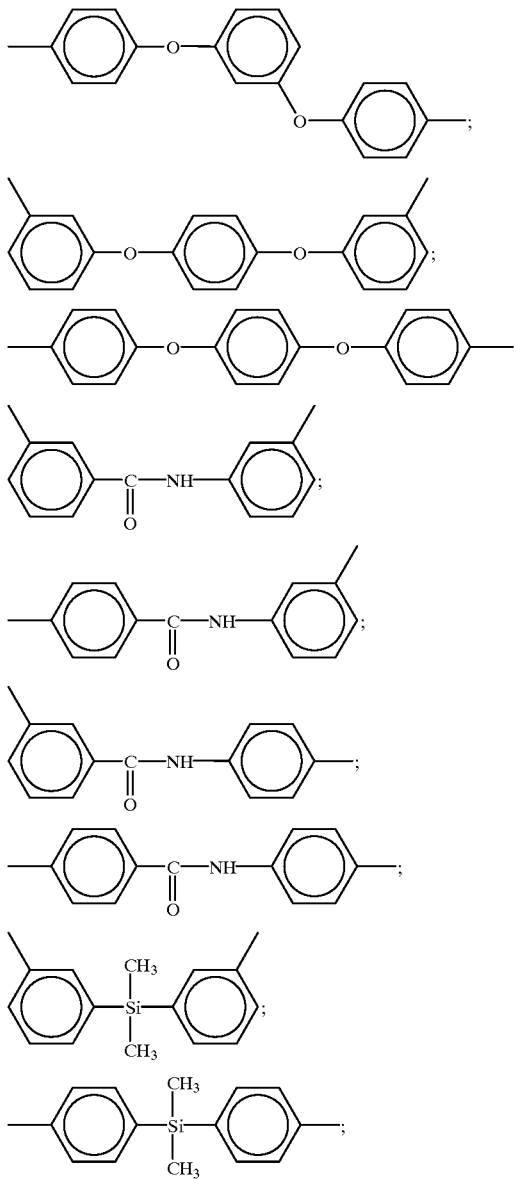

Examples of the Ar₂ groups are as follows:

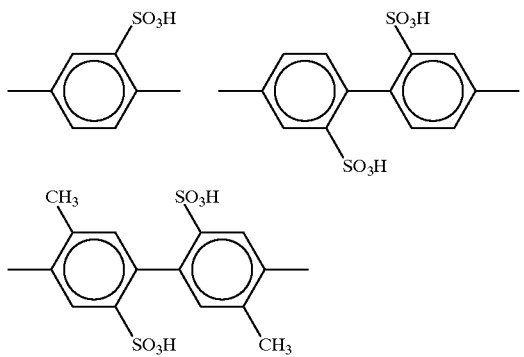

Among the Ar₂ groups one may also mention any one of the Ar₁ groups mentioned above carrying, in addition, one or more SO₃H groups on its ring(s) and/or heterocyclic ring(s).

The polyimides which are the subject of the invention can be obtained by any method known to a man skilled in the art for the preparation of polyimides in general.

Examples of known methods of preparation of polyimides are notably the following:

reaction of a di-anhydride and a di-amine reaction of a di-acid di-ester and a di-amine.

It is obvious that the polyimides according to the invention can be prepared by methods which derive from the methods mentioned above or by other methods that can be used for the synthesis of polyimides.

The required modifications and optimisations of methods known and described in the literature can be easily carried out by a man skilled in the art.

Preferably, to prepare the polyimides according to the invention, the condensation of di-anhydrides onto di-amines in a two stage synthesis is used.

Such a method is currently used on an industrial scale and only requires small adaptations to allow the preparation of the polyimides according to the invention.

The synthesis of a condensation polyimide corresponds generally to the following diagram and is carried out in two stages:

In the first stage, the condensation reaction of a di-anhydride with a di-amine is carried out in order to obtain a polyamide-acid intermediate of formula (VI) called a "prepolymer" according to the diagram below given for the first type of repeating structure for polyimides of the invention.

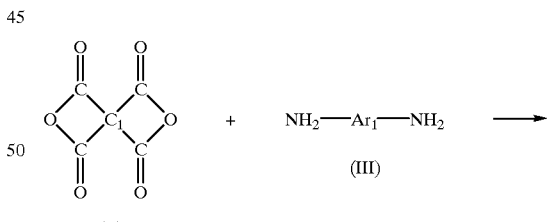

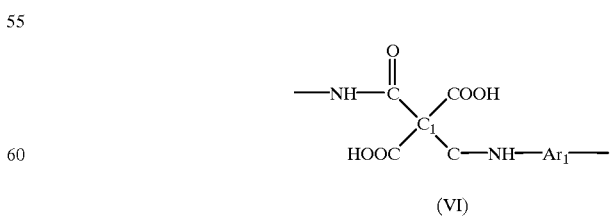

or according to the diagram below for the second type of repeating structure for polyimides according to the invention:

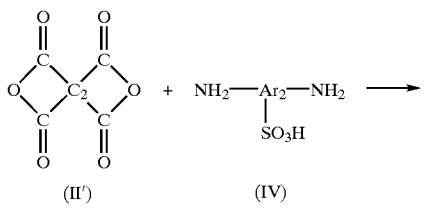

The starting products which are the di-anhydrides (II) and (II') or the bi-primary di-amines (III) (IV) are products which are readily available and, for the most part, of low cost.

Because of this, and conforming to one of the particularly interesting characteristics of this patent application, the polymers prepared and consequently the membranes obtained from these polymers have a relatively low cost: lowered by a factor of the order of 10, which is clearly a lower cost than the membranes of the prior art currently used notably in fuel cells.

One can also envisage a concomitant reduction in the cost price of fuel cells which would open up for them applications in fields such as providing energy for automobiles which until now they have been a long way from providing because of their excessive cost.

Among the di-anhydrides of general formula (II):

(II)

where $C_1$ has the meaning given above.

By way of examples, one may mention the di-anhydrides of the following aromatic tetracarboxylic acids: benzene 1,2,3,4-tetracarboxylic acid, benzene 1,2,4,5-tetracarboxylic acid, 1,1'-biphenyl 2,3',5',6'-tetracarboxylic acid, 1,1'-biphenyl 3,3',4,4'-tetracarboxylic acid, 1,1'-biphenyl 2,2',3,3'-tetracarboxylic acid, 1,1',1"-terphenyl 2,3',5',6'-tetracarboxylic acid, naphthalene 1,2,5,6 tetracarboxylic acid, naphthalene 2,3,6,7 tetracarboxylic acid, naphthalene 1,2,4,5 tetracarboxylic acid, naphthalene 1,2,5,6 tetracarboxylic acid, naphthalene 1,4,5,8 tetracarboxylic acid, perylene 3,4,9,10 tetracarboxylic acid, phenanthrene 1,8,9, 10 tetracarboxylic acid, 4,4'-oxybis-(benzene 1,2-dicarboxylic) acid, 4,4'-thiobis-(benzene 1,2-dicarboxylic) acid, 4,4'-sulphonylbis-(benzene 1,2-dicarboxylic) acid, 4,4'-methylenebis-(benzene 1,2-dicarboxylic) acid, 4,4'-difluoromethylenebis-(benzene 1,2-dicarboxylic) acid, 3,3'-carbonylbis-(benzene 1,2-dicarboxylic) acid, 4,4'-carbonylbis-(benzene 1,2-dicarboxylic) acid, 4,4'-methyl-1 ethylidene-1,1-bis (benzene 1,2-dicarboxylic) acid, 4,4'-trifluoromethyl-1 trifluoro-2,2,2 ethylidene-1,1-bis (benzene 1,2-dicarboxylic) acid, 4,4'-phenylene-1,3-bis (carbonylbenzene 1,2-dicarboxylic) acid, 4,4'-phenylene-1, 3-bis (carbonylbenzene 1,2-dicarboxylic) acid, 4,4'-phenylene-1,4-bis (carbonylbenzene 1,2-dicarboxylic) acid, 4,4'-phenylene-1,3-bis (oxybenzene 1,2-dicarboxylic) acid, 4,4'-phenylene-1,4-bis (oxybenzene 1,2-dicarboxylic) acid, 4,4'-methyl-1 ethylidene-1,1-bis (phenylene-1,4-oxy)-bis (benzene 1,2-dicarboxylic) acid, pyrazine 2,3,5,6-tetracarboxylic acid, thiophene 2,3,4,5-tetracarboxylic acid and 3,3',4,4'-tetracarboxy benzanilide.

The di-anhydrides of general formula (II')

(II')

where $C_2$ which has the meaning already given to it above can be chosen from among the same compounds mentioned above for the di-anhydrides of formula (II).

Among the biprimary di-amines of formula (III) $H_2N$—$Ar_1$—$NH_2$ where $Ar_1$ has the same meaning already given to it above and which can be used in the preparation of polyimides of the invention, one may mention 1,3-diaminobenzene, 1,4-diaminobenzene, 6-methyl-1,3-diaminobenzene, 2-methyl-1,3-diaminobenzene, 5-methyl-1,3-diaminobenzene, 4,4'-diamino-1,1'-biphenyl, 3,3'-4,4'-diamino-dimethyl-1,1'-biphenyl, 4,4'-diamino-3,3'-dimethoxy-1,1'-biphenyl, 4,4'-diamino-3,3'-dichloro-1,1'-biphenyl, methylenebis(4,4'-benzene amine), methylenebis (3,3'-benzene amine) methylenebis (3-methyl-4,4'-benzene amine), methylenebis (3-isopropyl-4,4'-benzene amine), oxybis (4,4'-benzene amine), oxybis(3,3'-benzene amine), carbonylbis(4,4'-benzene amine), carbonylbis(3,3'-benzene amine), thiobis(4,4'-benzene amine), thiobis(3,3'-benzene amine), sulphonylbis(4,4'-benzene amine), sulphonylbis(3, 3'-benzene amine), hydroxymethylenebis (4,4'-benzene amine), hydroxymethylenebis(3,3'-benzene amine), difluoromethylenebis(4,4'-benzene amine), 1-methylethylidenebis(4,4'-benzene amine), 1-trifluoromethyl-2,2,2-trifluoroethylidenebis(4,4'-benzene amine), 1,3-dioxyphenylenebis (3,3'-benzene amine), 1,3-dioxyphenylenebis (4,4'-benzene amine), 1,4-dioxyphenylenebis(3,3'-benzene amine), 1,4-dioxyphenylenebis(4,4'-benzene amine), 3,3'-diaminobenzanilide, 3,4'-diamino-benzanilide, 3',4-diaminobenzanilide, 4,4'-diamino-benzanilide, bis(3-aminophenyl) dimethylsilane, bis(4-aminophenyl) dimethylsilane and 9-fluoro-9-ylidene bisphenylamine.

Among the sulphonated biprimary diamines of formula (IV)

(IV)

$NH_2$—$Ar_2$—$NH_2$
        |
        $SO_3H$ where $Ar_2$ has the meaning already given to it above and which can be used in the context of the preparation of polyimides of the invention. One may mention for example 1,4-diaminobenzene-3-sulphonic acid, 4,4'-diamino-1,1'-biphenyl-2,2'-disulphonic acid.

The condensation of the di-anhydrides with the diamines can occur, within the context of the invention with or without a chain limiting agent.

However, it is preferable to use a chain limiting agent, preferably of the anhydride type, since one thereby avoids the presence on the end of the chain of an amine group which can be easily oxidised.

Among the chain limiting agents of the anhydride type that are suitable, for the preparation of polyimides according to the invention, one may mention functional anhydrides with the following formula (V):

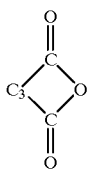

(V)

where $C_3$ has the meaning already given to it.

Examples of anhydrides of formula (V) are phthalic anhydride, 3-fluorophthalic anhydride and naphthalene-1,8-dicarboxylic acid anhydride.

In a second stage, the synthesis of the polyimide itself is carried out according to the following diagram given by way of example for the first type of repeating structure;

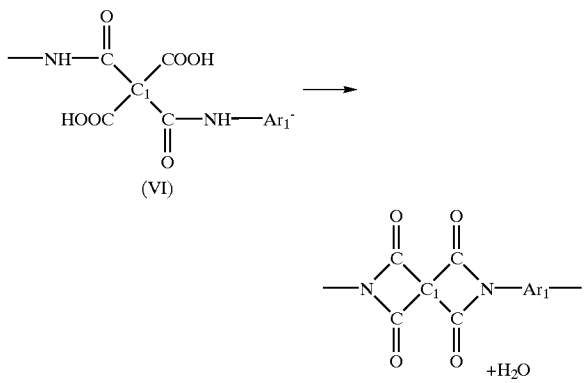

(VI)

In the first step of the method for the preparation of polyimides according to the invention, the starting reactants can be dissolved in a suitable solvent.

The solvent can be any suitable solvent known to a man skilled in the art appropriate to the polycondensation reaction of a di-anhydride with a diamine.

In a preferred embodiment, the solvent is an aprotic polar solvent chosen, for example, from among dimethylformamide, dimethylacetamide, N-methylpyrrolidone, alone or in a mixture with, for example, aromatic solvents such as xylene or solvents of the glycol ether type.

The solvent can also be a solvent of the phenolic type, that is to say, it is chosen, for example, from among phenol, phenols substituted by one or more halogens (Cl, I, Br, F), the cresols (o-, m-, and p-cresol), cresols substituted by a halogen (Cl, I, Br, F) and mixtures of these.

The preferred solvents will be constituted by m-cresol and a mixture of para-chlorophenol or meta-chlorophenol and phenol, for example in the proportion of 20% phenol to 80% of para- or meta- chlorophenol.

By reactants, one understands the compounds (II), (III), (II'), (IV) and possibly (V) already described above. One can, for example, begin by reacting, as initial reactants present, the mixture of a di-anhydride (II) and/or a di-anhydride (II') with a sulphonated diamine (IV) and then add afterwards the second diamine (III).

All the combinations possible relating to the order of addition of the reactants can easily be determined by a man skilled in the art.

The condensation reaction of the first step is carried out in the solvent generally at ordinary temperature, for example 20–25° C. and the polyamide-acid intermediate or prepolymer is formed.

The polyamide-acid intermediate obtained can be used, for example, to prepare a film, for example by casting; the solvent is then evaporated at a temperature of from 50 to 150° C. to give a final polyamide acid and the polyimide according to the invention is obtained conforming to the second step either by heat treatment at a temperature below 250° C. (that is to say below the desulphonation temperature) or by chemical dehydration by using acetic anhydride.

Another preferred alternative consists of heating the starting solution including, in the first case all of the reactants, to a temperature, for example, of from 120 to 200° C. for a period of, for example, from 6 to 72 hours.

The starting solution can, as has already been mentioned above, only contain, in the second case, a part of the reactants necessary for the preparation of the final polyimide, for example, the starting mixture may only include compounds (II) and/or (II') and (IV). In this case, the mixture is brought to a temperature, for example, of from 120 to 200° C. for a period of, for example, of from 6 to 72 hours and then the mixture is allowed to cool to a temperature, for example, of 20 to 50° C. and the rest of the reactants, for example, compounds (III) and (II) are added.

The one brings the temperature of the mixture to, for example, between 120 and 200° C. for a period of from 6 to 72 hours.

In both cases, the heating causes cyclisation of the amide to an imide and the final product, the polyimide of the invention is obtained.

The polymerisation is stopped by cooling the solution, for example to ambient temperature. Then the solution is poured, preferably slowly, under strong stirring, into a receptacle containing, for example methanol or ethanol.

The generally fibrous solid that precipitates is separated, for example, by filtration and is then preferably washed one or more times, for example, with a sufficient quantity of, for example, methanol.

The polymer obtained is then dried, preferably at a temperature of from 50 to 120° C., for example in a force ventilated oven for a sufficient period of time.

A further subject of this invention is a film or a membrane, comprising the sulphonated polyimide described above.

The films or membranes can be prepared in the traditional manner, for example, by casting, that is to say the polymer according to the invention is dissolved in a suitable solvent such as cresol or phenol, and then poured onto a flat surface such as a glass plate and then dried to form a film with a thickness of from 5 to 200 μm.

The films can be used to prepare membranes that isolate, in particular, the anode and cathode compartments of a fuel cell that can operate, for example, with the following systems:

hydrogen, alcohols such as methanol, at the anode
oxygen, or air at the cathode.

Another subject of this invention is a fuel cell device comprising one or more membranes comprising the sulphonated polyimide according to the invention.

Because of its excellent mechanical properties, the membrane can be subjected to the stresses (clamping etc.) linked to it being mounted in such a device, without damage.

The fuel cell can correspond to the diagram already given in FIG. 1, that is to say, the membrane according to the invention is positioned at (1) between two electrodes (11) for example made of carbon fabric that has been treated with platinum (or any other noble metal), preferably impregnated with a compound such as Nafion® or the polyimide itself, with the aim of having one electrode per unit volume.

This assembly can then be arranged, for example, between two plates made of sealed graphite, impregnated with resins, which, on the one hand ensure the distribution of the hydrogen (4) or other compound, on the anode side (7) and on the other hand, of oxygen (5) on the cathode side (8).

The cell can also comprise means (not shown) of adjusting the temperature, such as copper plates thermostated by heating rods in a monocell or heat exchangers in a module, and means of regulating the operation of the cell which are connected to the external circuit (10); the means are constituted, for example, by flow regulators, temperature regulators, pressure regulators and an electronic load to regulate the current.

The temperature of the cell is generally maintained between 50 and 80° C. and under these conditions, it produces, for example, a current of 0.25 A/cm$^2$ with a voltage of 0.6 V and this over a very long duration that can reach as much as 3000 hours, which demonstrates the excellent properties of thermal stability and others of the membrane and its excellent electrical properties in comparison with the membranes of the prior art, for example made of Nafion® (0.25 A/cm$^2$; 0.7 V; 5000 hours).

The invention will now be described, making reference to the following examples, given as examples and being non-limitative.

EXAMPLE 1

The polycondensation reaction is carried out in a 500 cm$^3$ glass reactor fitted with an anchor stirring system, an inlet for an inert gas, such as nitrogen and a temperature probe. A thermostated oil bath is used to adjust the temperature of the reaction medium.

The reactor is charged with 250 g of m-cresol and 10 g (0.029 mole) of 4,4'-diamino-(1,1'-biphenyl)-2,2'-disulphonic acid. Then 30 g (0.096 mole) of 5,5'-oxy-bis-(1,3-iso-benzofurandione) is added.

This mixture is brought to a temperature of 180° C. for 4 hours. During this period, the viscosity of the medium increases progressively.

Then, the heating is stopped whilst maintaining the agitation and the reaction mixture is allowed to cool to a temperature of about 50° C.

Then, 13.4 g (0.067 mole) of 4,4'-methylene bis-benzene amine all at once before bringing the temperature of the mixture once again to 180° C. for about two hours, a period during which the viscosity increases rapidly.

The polymerisation is stopped by cooling the solution to ambient temperature, and then by pouring it slowly, under strong agitation into a receptacle containing two liters of methanol.

The fibrous solid which precipitates is isolated by filtration and washed twice with two liters of methanol.

The polymer thus obtained is then dried in a force ventilated oven at 120° C. for about six hours.

Its ion exchange capacity is 1.15 meq/g.

EXAMPLE 2

The method of Example 1 is used to prepare a sulphonated polyimide by reacting 220 g of m-cresol, 33.5 g (0.108 mole) of 5,5'-oxy-bis (1,3-isobenzofurandione), 7.5 g (0.021 mole) 4,4'-diamino-(1,1'-biphenyl)-2,2'-disulphonic acid and 17.25 g of 4,4'-methylene bis-benzene amine.

The polymer obtained had an ion exchange capacity of 0.8 meq/g.

EXAMPLE 3

The method of Example 1 is used to prepare a sulphonated polyimide by reacting 300 g of m-cresol as solvent, 45 g (0.145 mole) of 5,5'-oxy-bis-(1,3-isobenzofurandione), 16.2 g (0.043 mole) of 4,4'-diamino-5,5'-dimethyl-(1,1'-biphenyl)-2,2'-disulphonic acid and 20.25 g (0.102 mole) of 4,4'-methylene-bis-benzene amine.

The polymer thus obtained has an ion exchange capacity of 1.14 meq/g.

EXAMPLE 4

The equipment for the reaction described in Example 1 is used for the preparation of a sulphonated polyimide.

The reactor is charged with a mixture of solvents made up of 210 g of phenol and 140 g of para-chlorophenol.

Then, all at once, 5 g (0.015 mole) of 4,4'-diamino-(1,1'-biphenyl)-2,2'-disulphonic acid, 12.97 g (0.048 mole) of the di-anhydride of 1,4,5,8-naphthalene tetracarboxylic acid and 6.7 g (0.034 mole) of 4,4'-oxy-benzene amine.

The reaction mixture is heated to 150° C. for five hours.

After cooling to 60° C., the solution is poured, under strong agitation, into two liters of methanol.

The fibrous solid which forms is isolated by filtration and treated twice with 500 cm$^3$ of methanol.

The polymer thus obtained is dried under vacuum at 120° C. for-six hours.

Its ion exchange capacity is 1.28 meq/g.

EXAMPLE 5

The method of Example 4 is used to prepare a sulphonated polyimide by reacting, in a mixture of solvents made up of 180 g of phenol and 140 g of para-chlorophenol, 8.32 g (0.0242 mole) of 4,4'-diamino-(1,1'-biphenyl)-2,2'-disulphonic acid, 12.975 g (0.048 mole) of the di-anhydride of 1,4,5,8-naphthalene-teracarboxylic acid and 8.08 g (0.024 mole) of 4,4'-(2,2,2-tifluoro-(1-trifluoromethyl)-ethylidene)-benzene amine.

The polymer obtained has an ion exchange capacity of 1.73 meq/g.

EXAMPLE 6

This example illustrates how the films of sulphonated polyimide according to this invention can be used, to prepare membranes that isolate the anode and cathode compartments of a fuel cell able to operate with hydrogen and oxygen at the cathode.

A membrane of sulphonated polyimide according to the invention (prepared from the polymer of Example 1) with an ion exchange capacity of 1.15 meq/g and of thickness 80 µm, is positioned between two electrodes made of platinised carbon fabric (0.35 mg of Pt/cm$^2$) and impregnated with Nafion® (0.8 mg/cm$^2$).

This assembly is then inserted between two graphite plates which, on the one hand, ensure the distribution of the hydrogen on the anode side and of oxygen on the cathode side, and on the other hand provide the electrical conductivity.

The system is sealed by the use of flat gaskets made of "Viton" elastomer (not shown). For heating, for example, two copper plates are used.

An electronic load allows the operation of the cell to be regulated with respect to voltage or current. The experiment is carried out at a temperature of 50° C. with the pressure of oxygen and of hydrogen equal to 4 bars.

The membrane of phthalic type sulphonated polyimide according to the invention allowed a current of 500 mA/cm$^2$ to be obtained at a voltage of between 300 and 400 mV.

EXAMPLE 7 (COMPARATIVE)

A membrane made of Nafion® 117, a polymer having the following structure

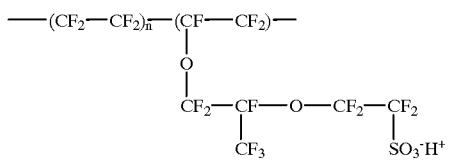

is used as a reference and the membrane is tested under the same conditions as those defined in Example 6 for the membrane of phthalic type sulphonated polyimide according to the invention.

FIG. 2 shows the polarisation curves obtained, on the one hand with the membrane according to the invention (full line) and on the other hand with the reference membrane made of Nafion®117 (broken line). They provide evidence of the equivalent and indeed superior performance that is obtained with the membrane according to the invention.

EXAMPLE 8

A membrane of phthalic type sulphonated polyimide (the polymer from Example 1) with an ion exchange capacity of 1.15 meq/g, is fitted in a cell in accordance with Example 6.

The cell is operated at a temperature held at 50° C. and a stable current of 150 mA/cm$^2$ is measured for a voltage of 400 mV for more than 400 hours.

EXAMPLE 9

A membrane of phthalic type sulphonated polyimide (the polymer from Example 1) with an ion exchange capacity of 1.15 meq/g, is fitted in a cell in accordance with Example 6.

The cell is operated at a temperature held at 70° C. and a voltage of 600 mV is measured for a current of 200 mA/cm$^2$ which decreases progressively by 1.2 mV per hour.

EXAMPLE 10

A membrane of naphthalenic type sulphonated polyimide (the polymer from Example 4), of thickness 170μm, having an ion exchange capacity of 1.28 meq/g, is placed in a cell in accordance with Example 6.

The cell is operated at a temperature held at 70° C. and a current of 1 A/cm$^2$ is measured with a voltage of 0.4 V.

EXAMPLE 11 (COMPARATIVE)

A membrane made of Nafion®117 is positioned in the same cell and is tested under the same conditions of operation as those defined for Example 10 for the membrane of naphthalenic type sulphonated polyimide according to the invention.

FIG. 3 which shows the polarisation curves obtained, on the one hand with the membrane according to the invention (full line) and on the other hand with the reference membrane made of Nafion®117 (broken line) provides evidence of the equivalent and indeed superior performance that is obtained with the membrane according to the invention.

EXAMPLE 12

A membrane of the fluorinated naphthalenic type sulphonated polyimide (the polymer from Example 5), the thickness of which is 150 μm is positioned in a cell in accordance with Example 6. The cell is operated at a temperature held at 70° C. and a voltage of 650 mV is measured for a current of 250 mA/cm$^2$ which remains stable for more than 2500 hours.

This example demonstrates once again the superior durability properties of polymers according to the invention, namely that they are able to achieve several thousand hours, of operation, which is compatible with an application, for example, in an electric vehicle where a durability of around 3000 hours is demanded.

What is claimed is:

1. A fuel cell device comprising at least one membrane, wherein the membrane comprises a polyimide, and wherein the polyimide is a sulphonated polymer characterized in that it comprises repeating structures of formula ($I_n$)

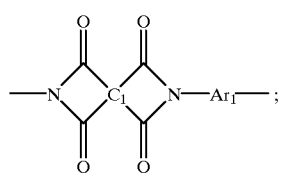

and repeating structures of formula ($I_m$)

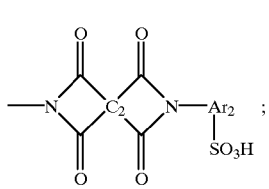

in which
the groups $C_1$ and $C_2$ can be identical or different and each represent a tetravalent group that includes at least one optionally substituted aromatic carbon ring and/or optionally substituted heterocyclic ring with aromatic character, said aromatic carbon ring(s) each having from 6 to 10 ring atoms of carbon and said heterocyclic ring(s) with aromatic character each having from 5 to 10 ring atoms and including one or more heteroatoms selected from the group consisting of sulphur, nitrogen and oxygen; $C_1$ and $C_2$ each forming with the neighboring imide groups rings with 5 or 6 atoms;
the $Ar_1$ and $Ar_2$ groups can be identical or different and each represent a divalent group that includes at least one optionally substituted aromatic carbon ring and/or optionally substituted heterocyclic ring with aromatic character, said aromatic ring(s) having from 6 to 10 ring atoms of carbon and said heterocyclic ring(s) with aromatic character having from 5 to 10 ring atoms and including one or more heteroatoms selected from the group consisting of sulphur, nitrogen and oxygen; and wherein, the SO₃H group attached to Ar₂, may be attached to any one of the aromatic carbon ring(s) or the heterocyclic ring(s) with aromatic character.

2. The fuel cell device according to claim 1, wherein the sulphonated polyimide is characterized in that it corresponds to the following formula (I):

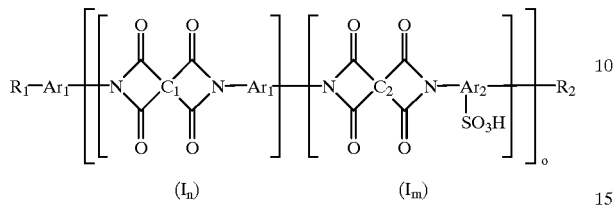

in which $C_1$, $C_2$, $Ar_1$ and $Ar_2$ are defined in claim 1 and where each of the groups $R_1$ and $R_2$ represent $NH_2$ or a group of the formula:

where $C_3$ is a divalent group that includes at least one optionally substituted aromatic carbon ring having from 6 to 10 ring atoms of carbon and/or optionally substituted heterocyclic ring with aromatic character having from 5 to 10 ring atoms and including one or more heteroatoms selected from the group consisting of sulphur, nitrogen and oxygen.

3. The fuel cell device according to claim 2, wherein the sulphonated polyimide is characterized in that $C_1$ and $C_2$ can be identical or different and are selected from the group consisting of:
  a) a benzene ring, optionally substituted by one or two substituents independently selected from the group consisting of alkyl groups having 1 to 10 atoms, alkoxy groups having 1 to 10 carbon atoms, and halo,
  b) several benzene rings optionally substituted by one or more substituents selected from the group consisting of alkly groups having 1 to 10 atoms, alkoxy groups having 1 to 10 carbon atoms, and halo, linked to one another by a single bond or by a divalent group, and
  c) condensed aromatic carbon polycyclic group optionally substituted by one or two substituents independently selected from the group consisting of alkyl groups having 1 to 10 carbon atoms, alkoxy groups having 1 to 10 carbon atoms and halo;

$Ar_1$ and $Ar_2$ can be identical or different and are selected from the group consisting of:
  a) a divalent benzene ring with meta or para links, optionally substituted by one or more substituents selected from the group consisting of alkyl groups having 1 to 10 carbon atoms, alkoxy groups having 1 to 10 carbon atoms and halo,
  b) several benzene rings, optionally substituted by one or more substituents selected from the groups consisting of alkyl groups having 1 to 10 carbon atoms, alkoxy groups having 1 to 10 carbon atoms and halo, linked to one another by a single bond or by a divalent group,
  c) the heterocyclic group with aromatic character, optionally substitute by one or more substituents selected from the group consisting of alkyl groups having 1 to 10 carbon atoms, alkoxy groups having 1 to 10 carbon atoms and halo, and
  d) a condensed heterocyclic group with aromatic character, optionally substituted by one or more substituents selected from the group consisting of alkyl groups having 1 to 10 carbon atoms, alkoxy groups having 1 to 10 carbon atoms and halo.

* * * * *